United States Patent
Zhu

(10) Patent No.: US 8,606,228 B2
(45) Date of Patent: Dec. 10, 2013

(54) METHOD, USER NETWORK EQUIPMENT AND MANAGEMENT SYSTEM THEREOF FOR SECURE DATA TRANSMISSION

(75) Inventor: Li Zhu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,993

(22) PCT Filed: Jun. 28, 2010

(86) PCT No.: PCT/CN2010/074616
§ 371 (c)(1),
(2), (4) Date: Oct. 24, 2011

(87) PCT Pub. No.: WO2011/088662
PCT Pub. Date: Jul. 28, 2011

(65) Prior Publication Data
US 2013/0130647 A1    May 23, 2013

(30) Foreign Application Priority Data

Jan. 22, 2010 (CN) .......................... 2010 1 0100117

(51) Int. Cl.
*H04M 1/66* (2006.01)
*H04M 1/68* (2006.01)
*H04M 3/16* (2006.01)
*H04W 4/00* (2009.01)

(52) U.S. Cl.
USPC ............ 455/410; 455/411; 370/328; 370/338

(58) Field of Classification Search
USPC ............. 455/411, 434, 435.1, 436, 437, 444, 455/450, 452.1
See application file for complete search history.

(56) References Cited

U.S. PATENT DOCUMENTS

2004/0208151 A1*  10/2004  Haverinen et al. ............ 370/338
2009/0156213 A1*   6/2009  Spinelli et al. ................ 455/436
2009/0265542 A1   10/2009  Khetawat et al.

FOREIGN PATENT DOCUMENTS

| CN | 101351016 A | 1/2009 |
| CN | 101400106 A | 4/2009 |
| CN | 101500218 A | 8/2009 |

OTHER PUBLICATIONS

3GPP TS 32.583 V8.1.0 (Sep. 2009) 3rd Generation Partnership Project; Technical Specification Group Services and System Aspects; Telecommunication management; Home Node B (HNB) Operations, Administration, Maintenance and Provisioning (OAM&P); Procedure flows for Type 1 interface HNB to HNB Management System (HMS) (Release 8), Sep. 2009.*
International Search Report for PCT/CN2010/074616 dated Oct. 9, 2010.

* cited by examiner

*Primary Examiner* — Marisol Figueroa
*Assistant Examiner* — Erica Navar
(74) *Attorney, Agent, or Firm* — Ling Wu; Stephen Yang; Ling and Yang Intellectual Property LLC

(57) ABSTRACT

A method for secure data transmission, and the method includes: after a Home (evolved) Node-B (H(e)NB) establishes a connection with a H(e)NB Management System (H(e)MS), data is transmitted between the H(e)NB and the H(e)MS via a secure path; when the H(e)NB or the H(e)MS receives data, verify the integrity and/or the confidentiality of said received data, and if the verification fails, retain or discard said received data. The present invention also provides user network equipment and a user network equipment management system for secure data transmission. The present invention removes various threats caused by the insecure data transmission and a variety of inconveniences caused by improperly handling downloaded data of the H(e)NB in practical applications.

7 Claims, 3 Drawing Sheets

METHOD, USER NETWORK EQUIPMENT AND MANAGEMENT SYSTEM THEREOF FOR SECURE DATA TRANSMISSION

TECHNICAL FIELD

The present invention relates to the field of wireless communication, and more especially, to a method, user network equipment and management system for secure data transmission.

BACKGROUND OF THE RELATED ART

A Home Node-B (HNB) is used to provide the third generation mobile communication system (3G) wireless coverage to the 3G mobile phone in the home area so as to connect the existing residential broadband service. It comprises the function of one standard node B (one element in the 3G macro radio access network) and radio resource management functions of one standard radio network controller (RNC).

FIG. 1 describes the system architecture of a HNB. Wherein, the interface between the third Generation Partnership Project (3GPP) and the HNB is a backhaul and compatible air interface in the universal terrestrial radio access network (UTRAN). The HNB accesses the operator's core network via a security gateway (SeGW), wherein the broadband Internet protocol (IP) backhaul between the HNB and the SeGW might be insecure. In the backhaul, the transmitted information should be protected by a secure channel established between the HNB and the SeGW. The SeGW is on behalf of the operator's core network to carry out mutual authentication with the HNB. The HNB Gateway (HNB GW) and SeGW are two logically separated entities within the operator's core network, and they are used to control the access of the user equipment (UE) in a non closed subscriber group (CSG). The HNB management system (HMS) connects directly with the HNB via broadband IP backhaul, or via the SeGW. The HMS requires secure communications.

FIG. 2 describes the system architecture of a home evolved Node-B (HeNB). The difference between the HeNB and the HNB is that the HeNB is an air interface connecting the 3GPP user equipment with the Evolved Universal Terrestrial Radio Access Network (EUTRAN).

H(e)NB (Home (evolved) Node-B) comprises a HNB and a HeNB, and the HNB and the HeNB are collectively called H(e)NB. The H (e) NB Management System (H(e)MS) comprises a HMS and a HeMS and the HMS and the HeMS are collectively called H(e)MS.

For H(e)NB security, 3GPP TR 33.820 defines 27 kinds of threats. These 27 kinds of threats are grouped into seven categories. They are respectively: threat to the H(e)NB certificate, physical attack on the H(e)NB, attack on the H(e)NB structure, attack on the H(e)NB protocol, attack on the core network (including attack based on H(e)NB location), attack on user data and identity privacy and attack on radio resources and management.

In the 27 kinds of threats defined in 3GPP TR 33.820, threats such as deceptive software update and software architecture change, wrong configuration of H(e)NB, incorrect configuration of an access control list or attack on access control list, attack on the middleman in the H(e)NB, and attack on the H(e)MS and its transmission data, are due to insecure downloading of the H(e)NB configuration data or software.

In practical applications, due to the large-scale use of H(e) NB and great breadth and flexibility of application, since the insecure transmission of data or software imposes a heavier burden and threats to the H(e)NB and the H(e)MS, there is not a perfect solution for securely transmitting the H(e)NB data in the related specifications to date. In particular, there is not any reasonable operation on the already downloaded but not authenticated configuration data and the H(e)NB software update.

SUMMARY OF THE INVENTION

The technical problem to be solved by the present invention is to provide a method and system, user network equipment and its management system for secure data transmission, to overcome a variety of threats because of insecure data transmission between a H(e)NB and a H(e)MS.

In order to solve above technical problems, the present invention provides a method for secure data transmission, and the method comprises:

after a home Node-B (HNB) establishes a connection with a HNB management system (HMS), data is transmitted between the HNB and the HMS via a secure path; after the HNB or the HMS receives data, verifies the integrity and/or confidentiality of the received data, and if the verification fails, retains or discards the received data; or, after a home evolved Node-B (HeNB) establishes a connection with a HeNB management systems (HeMS), data is transmitted between the HeNB and the HeMS via a secure path; after the HeNB or the HeMS receives data, verifies the integrity and/or confidentiality of the received data, and if the verification fails, retains or discards the received data.

The data transmitted between the HNB and the HMS or between the HeNB and the HeMS comprises one or more of configuration data, software update data and request messages.

The step of transmitting data between the HNB and the HMS via a secure path comprises:

the data transmitted between the HNB and HMS is protected via the IP security protocol (IPsec) tunnel and/or Transport Layer Security (TLS) tunnel;

the step of transmitting data between the HeNB and the HeMS via a secure path comprises:

the data transmitted between the HeNB and HeMS is protected via the IPsec tunnel and/or the TLS tunnel.

The abovementioned method might comprise:

if the HNB or the HeNB or the HMS or the HeMS fails to verify the received data, further report to network elements related to the data transmission.

The network elements related to data transmission are one or more of the following network elements:

the HNB or HeNB or HMS or HeMS for transmitting data; or the server indicated by the HMS or the server indicated by the HeMS.

All or part of the retained data is used in statistical analysis, fraud detection, error checking or further confirmation.

In order to solve the abovementioned technical problem, the present invention provides a system for secure data transmission, and the system comprises a HNB and a HMS, wherein:

the HNB is configured to: after establishing a connection with HMS, transmit data to or receive data from the HMS via a secure path; and when receiving data, verify the integrity and/or the confidentiality of the data received by the HNB, and if the verification fails, retain or discard the data received by the HNB;

the HMS is configured to: after establishing a connection with HNB, transmit data to or receive data from the HNB via a secure path; and when receiving data, verify the integrity and/or the confidentiality of the data received by the HMS, and if the verification fails, retain or discard the data received by the HMS.

The HNB is also configured to: if the verification of the received data fails, report to the server indicated by the HMS and/or HMS transmitting data;

the HMS is also configured to: if the verification of the received data fails, further report to the HNB transmitting data.

In order to solve the abovementioned technical problem, the present invention provides a system for secure data transmission, and the system comprises a HeNB and a HeMS, wherein:

the HeNB is configured to: after establishing a connection with HeMS, transmit data to or receive data from the HeMS via a secure path; and when receiving data, verify the integrity and/or the confidentiality of the data received by the HeNB, and if the verification fails, retain or discard the data received by the HeNB as insecure data;

the HeMS is configured to: after establishing a connection with HeNB, transmit data to or receive data from the HeNB via a secure path; and when receiving data, verify the integrity and/or the confidentiality of the data received by the HeMS, and if the verification fails, retain or discard the data received by the HeMS;

the HeNB is also configured to: if the verification of the received data fails, further report to the HeMS transmitting data and/or the server indicated by the HeMS;

the HeMS is also configured to: if the verification of the received data fails, further report to the HeNB transmitting data.

In order to solve the abovementioned technical problem, the present invention provides user network equipment for secure data transmission, and the user network equipment is configured to:

after establishing a connection with the user network equipment management system, transmit data to or receive data from the user network equipment management system via a secure path; and when receiving data, verify the integrity and/or the confidentiality of the received data, and if the verification fails, retain or discard the received data; wherein, said user network equipment comprises a home Node-B (FINE) or a home evolved Node-B (HeNB); said user network equipment management system comprises a home Node-B management system (HMS) or a home evolved Node-B management system (HeMS); the HNB establishes a connection with the HMS, and the HeNB establishes a connection with the HeMS.

The user network equipment is also configured to: if the verification of the received data fails, report to the user network equipment management system transmitting data and/or the server indicated by the user network equipment management system.

In order to solve the abovementioned technical problem, the present invention provides a user network equipment management system for secure data transmission, and the user network equipment management system is configured to:

after establishing a connection with the user network equipment, transmit data to or receive data from the user network equipment via a secure path; and when receiving data, verify the integrity and/or the confidentiality of the received data, and if the verification fails, retain or discard the received data; wherein, said user network equipment management system comprises a home Node-B management system (HMS) or a home evolved Node-B management system (HeMS); said user network equipment comprises a home Node-B (HNB) or a home evolved Node-B (HeNB); the HMS establishes a connection with the HNB, and the HeMS establishes a connection with the HeNB.

The user network equipment management system is also configured to: if the verification of the received data fails, report to the user network equipment transmitting data.

The present invention improves the data downloading mechanism of the existing H(e)NB, increases the reliability and security of H(e)NB data transmission mechanism. It removes a variety of inconveniences and threats caused by the insecure data transmission and improperly handling the downloaded data of H(e)NB in practical applications.

PREFERRED EMBODIMENTS OF THE PRESENT INVENTION

Figure 1:
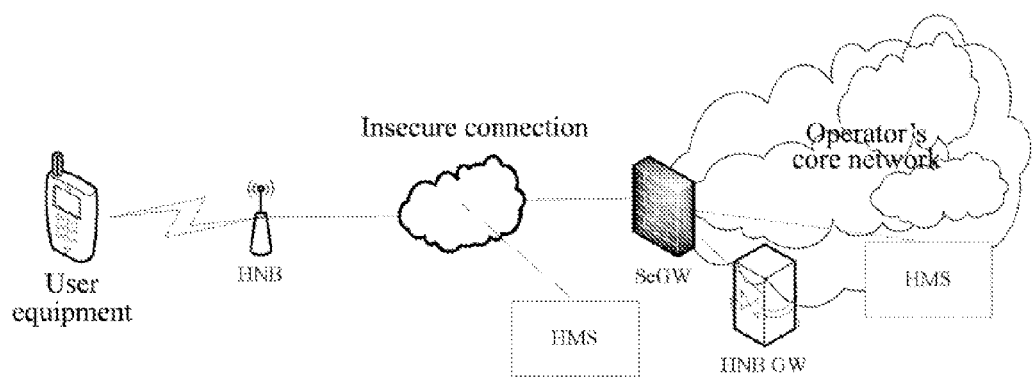
FIG. 1 is the system architecture of HNB.
Figure 2:
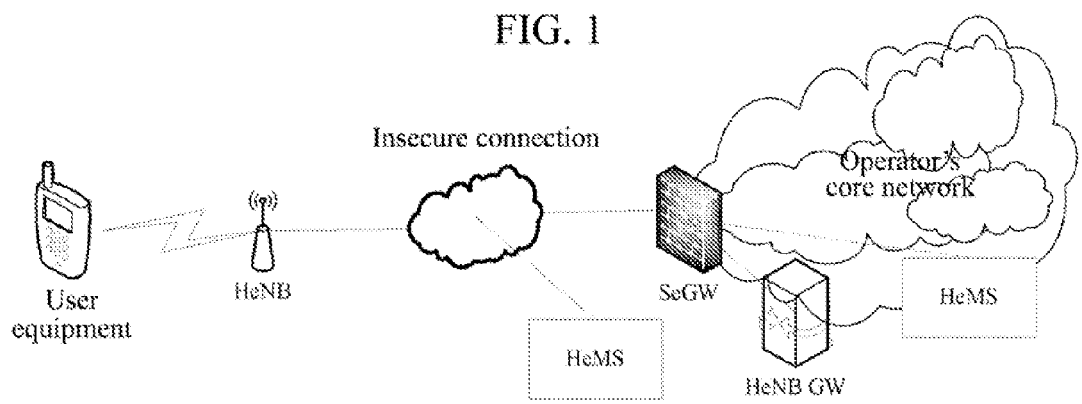
FIG. 2 is the system architecture of HeNB.

In the prior art, the HMS and the HeMS do not verify the received data, and the HNB and the HeNB might verify the received data, but there is no related solution in the prior art about how to deal with the data that fails to pass the verification.

In the present invention, after the HNB establishes a connection with the HMS, data is transmitted between the HNB and the HMS via a secure path; when the HNB and the HMS receive data, verify the integrity and/or confidentiality of the received data, and if the verification is successful, carry out a corresponding operation on the received data; if the verification fails, take the received data as insecure data, and retain or discard the received data; and, after the HeNB establishes a connection with the HeMS, data is transmitted between the HeNB and the HeMS via a secure path; when the HeNB and the HeMS receive data, verify the integrity and/or confidentiality of the received data, and if the verification is successful, carry out a corresponding operation on the received data; if the verification fails, take the received data as insecure data, and retain or discard the received data.

Wherein, the data transmitted between the HNB and the HMS and between the HeNB and the HeMS comprise configuration data, software update data and request messages and so on.

Correspondingly, the corresponding operation on the received data if the verification is successful refers to: data configuration, software installation or message response according to the received data.

Take the received data as the insecure data if the verification fails, and the corresponding operation, including the data configuration, software installation or message response and so on, will not be performed on the received data.

Transmitting data between the HNB and the HMS via a secure path specifically means:

the data transmitted between the HNB and HMS is protected by way of the IP security protocol (IPsec) tunnel and/or Transport Layer Security (TLS) tunnel and so on;

Transmitting data between the HeNB and the HeMS via a secure path specifically means:

the data transmitted between the HeNB and HeMS is protected by way of the IPsec tunnel and/or the TLS tunnel and so on.

Preferably, if the HNB or the HeNB or the HMS or the HeMS fails to verify the received data, further reports to network elements related to data transmission.

Wherein, the network elements related to data transmission are one or more of the following network elements:

(1) The HNB or HeNB or HMS or HeMS for transmitting data;

(2) The server indicated by the HMS or the server indicated by the HeMS;

(3) Other network elements that need to be reported, such as the security gateway.

Preferably, if said HNB or HeNB or HMS or HeMS fails to verify the received data, it takes the received data as the insecure data and retains the data, and all or part of the retained insecure data is used in statistical analysis, fraud detection, error checking or further confirmation.

A system for secure data transmission in accordance with an example of the present invention, and the system comprises a HNB and a HMS, the HNB is configured to: after establishing a connection with HMS, transmit data to or receive data from the HMS via a secure path; and when receiving data, verify the integrity and/or the confidentiality of the received data, and if the verification fails, take the received data as insecure data and retain or discard the received data;

the HMS is configured to: after establishing a connection with HNB, transmit data to or receive data from the HNB via a secure path; and when receiving data, verify the integrity and/or the confidentiality of the received data, and if the verification fails, take the received data as insecure data and retain or discard the received data.

Preferably, the HNB is also configured to: if the verification of the received data fails, report to the HMS transmitting data and/or the server indicated by the HMS and/or other network elements that need to be reported; the HMS is also configured to: if the verification of the received data fails, report to the HNB transmitting data and/or other network elements that need to be reported.

A system for secure data transmission in accordance with the example of the present invention, and the system comprises a HeNB and a HeMS, The HeNB is configured to: after establishing a connection with HeMS, transmit data to or receive data from the HeMS via a secure path; and when receiving data, verify the integrity and/or the confidentiality of the received data, and if the verification fails, take the received data as the insecure data, and retain or discard the received data;

The HeMS is configured to: after establishing a connection with HeNB, transmit data to or receive data from the HeNB via a secure path; and when receiving data, verify the integrity and/or the confidentiality of the received data, and if the verification fails, take the received data as the insecure data, and retain or discard the received data.

Preferably, the HeNB is also configured to: if the verification of the received data fails, report to the HeMS transmitting data and/or the server indicated by the HeMS and/or other network elements that need to be reported; the HeMS is also configured to: if the verification of the received data fails, report to the HeNB transmitting data and/or other network elements that need to be reported.

The present example also provides user network equipment for secure data transmission, and the user network equipment is configured to:

after establishing a connection with the user network equipment management system, transmit data to or receive data from the user network equipment management system via a secure path; and When receiving data, verify the integrity and/or the confidentiality of the received data, and if the verification fails, retain or discard the received data; wherein, said user network equipment comprises a home Node-B (HNB) or a home evolved Node-B (HeNB); said user network equipment management system comprises a HNB management system (HMS) or a HeNB management system (HeMS); the HNB establishes a connection with the HMS, and the HeNB establishes a connection with the HeMS.

Said user network equipment is also configured to: if the verification of the received data fails, report to the user network equipment management system that transmits data and/or the server indicated by the user network equipment management system.

The present example also provides a user network equipment management system for secure data transmission, and the user network equipment management system is configured to:

after establishing a connection with the user network equipment, transmit data to or receive data from the user network equipment via a secure path; and when receiving data, verify the integrity and/or the confidentiality of the received data, and if the verification fails, retain or discard the received data; wherein, said user network equipment management system comprises a home Node-B management system (HMS) or a home evolved Node-B management system (HeMS); said user network equipment comprises a home Node-B (HNB) or a home evolved Node-B (HeNB); the HMS establishes a connection with the HNB, and the HeMS establishes a connection with the HeNB.

The user network equipment management system is also configured to: if the verification of the received data fails, report to the user network equipment transmitting data.

In the following, the present invention will be described in detail in combination with the accompanying figures and specific examples.

In the following example, the HNB and HeNB are collectively referred to as H(e)NB, the HMS and HeMS are collectively referred to as H(e)MS.

Figure 3:
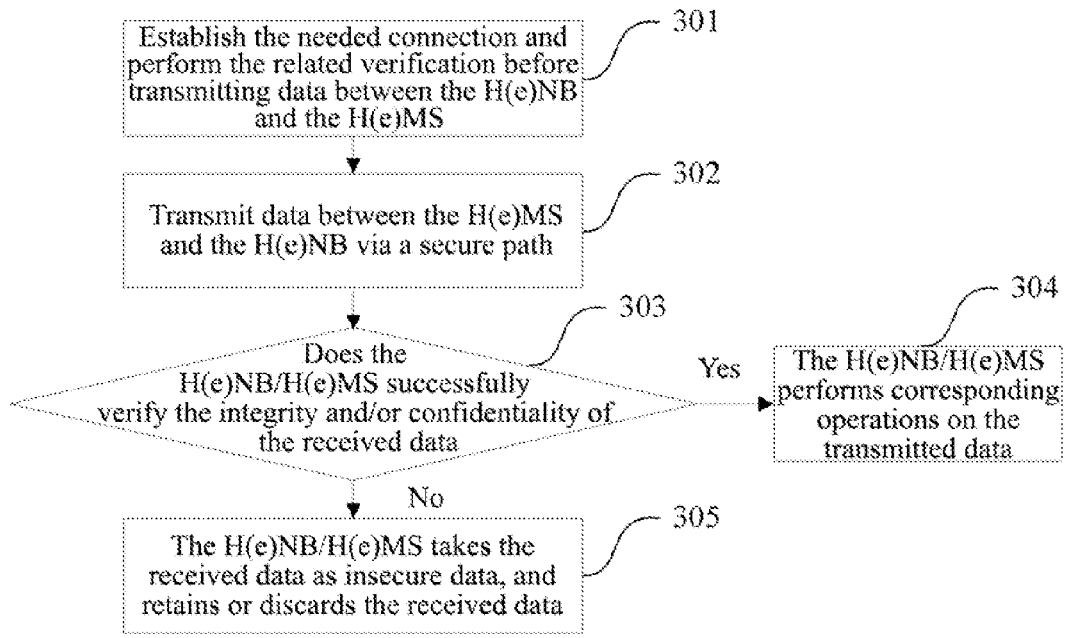
FIG. 3 is a flow chart of a method for secure H(e)NB data transmission in accordance with an example of the present invention.

As shown in FIG. 3, the method for secure data transmission in accordance with the example of the present invention comprises:

Step 301, establish the needed connection before transmitting data between the H(e)NB and the H(e)MS, and perform the related verification;

wherein, the related verification means identity authentication of the two parties;

Step 302, transmit data between the H(e)MS and the H(e)NB via a secure path;

the transmitted data comprises one or more of configuration data download, the software update, and the request message, and in general cases, the H(e)MS sends data such as the configuration data, software update data or request message to the H(e)NB, and the H(e)NB sends data such as request messages to the H(e)MS, or the H(e)MS provides a downloading path for the H(e)NB, and the H(e)NB downloads data from the relevant network elements (such as a data downloading server, etc.) according to the received downloading path;

the data transmission between the H(e)MS and the H(e)NB is protected by way of the IPsec tunnel and/or the TLS tunnel and so on;

Step 303, the H(e)NB/H(e)MS verifies the integrity and/or confidentiality of the received data, and if the verification is successful, proceed to step 304, otherwise proceed to step 305;

Step 304, the H(e)NB/H(e)MS performs corresponding operations such as data configuration and/or software installation and/or message response on the received data, and this process ends.

Step 305, the H(e)NB/H(e)MS takes the received data as insecure data, and retains or discards the received data;

wherein, the H(e)NB/H(e)MS taking the received data as insecure data means that the H(e)NB/H(e)MS does not perform corresponding operations such as data configuration, software installation, and message response on the received data. The H(e)NB/H(e)MS discards the received data or retains all or part of the received data, and part of the retained received data can be used for statistical analysis, fraud detection, error checking or further confirmation.

Further, the H(e)NB/H(e)MS reports above verification failed information to the relevant network elements that transmit data.

The relevant network elements for transmitting data might be one or more entities: the server indicated by the H(e)NB, the H(e)MS, the HMS, and/or the server which send data and/or other network elements that need to be reported and so on.

The First Application Example

Figure 4:
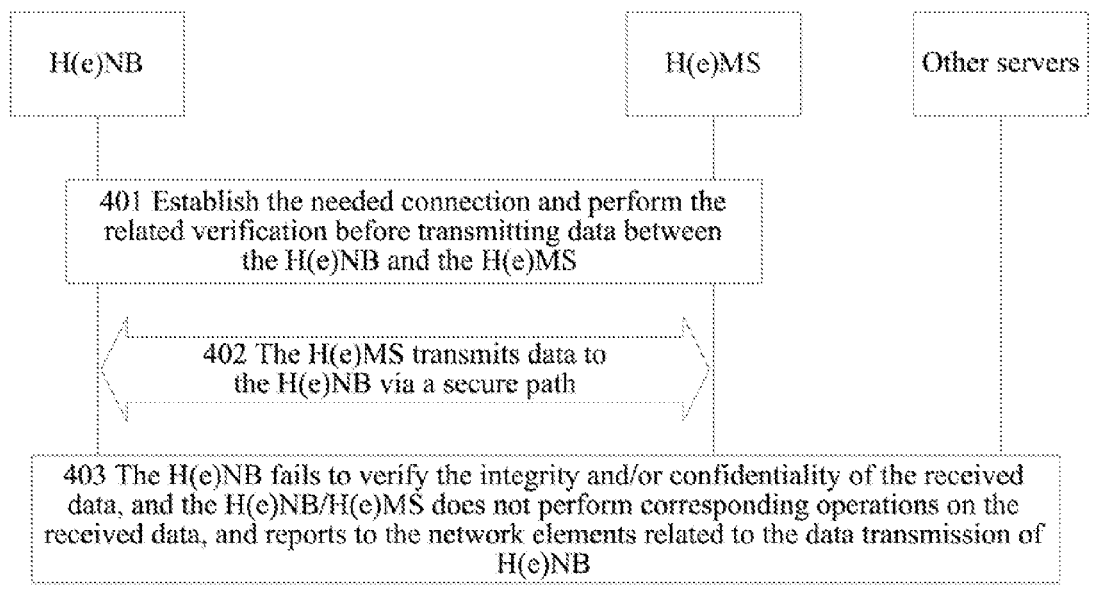
FIG. 4 is a first application example of a method for secure H(e)NB data transmission in accordance with the present invention.

In combination with FIG. 4, the first application example of the method for secure data transmission between the H(e)NB and the H(e)MS is described as follows:

Step 401, establish the needed connection and perform the related verification before transmitting data between the H(e)NB and the H(e)MS;

Step 402, the H(e)MS transmits data to the H(e)NB via a secure path;

the transmitted data comprises the configuration data and/or the software update and/or the request message and so on;

the data transmission between the H(e)MS and the H(e)NB is protected by the IPsec tunnel and/or the TLS tunnel;

Step 403, the H(e)NB verifies the integrity and/or confidentiality of the received data, and if the verification fails, the H(e)NB takes the received data as insecure data and retains or discards the received data, and the H(e)NB does not perform corresponding operations (data configuration, software installation, message response and so on) on the received data, and reports to the network elements (H(e)MS or the server indicated by the H(e)MS or other network elements that need to be reported and so on) related to the data transmission of H(e)NB. All or part of retained received data can be used in statistical analysis, fraud detection, error checking or further confirmation.

The Second Application Example

Figure 5:
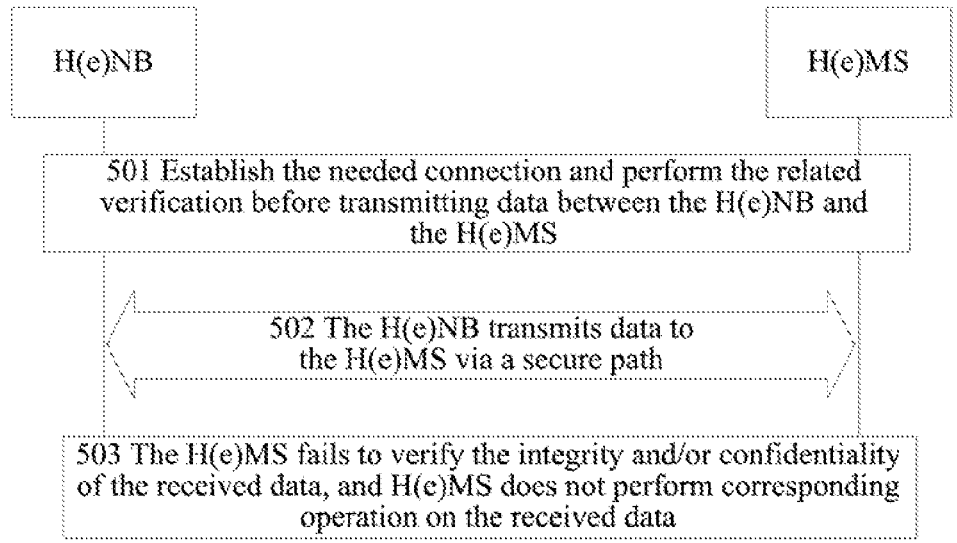
FIG. 5 is a second application example of a method for secure H(e)NB data transmission in accordance with the present invention.

In combination with FIG. 5, the second application example of the method for secure data transmission between the H(e)NB and the H(e)MS is described as follows:

Step 501, establish the needed connection and perform the related verification before transmitting data between the H(e)NB and the H(e)MS;

Step 502, the H(e)NB transmits data to the H(e)MS via a secure path;

the transmitted data might be the request message and so on;

the data transmission between the H(e)MS and the H(e)NB is protected by the IPsec tunnel and/or the TLS tunnel;

Step 503, the H(e)MS verifies the integrity and/or confidentiality of the received data, and if the verification fails, the H(e)MS takes the received data as insecure data, and retains or discards the received data, and does not perform corresponding operations (such as message response) on the received data. All or part of the retained received data can be used in statistical analysis, fraud detection, error checking or further confirmation.

The Third Application Example

Figure 6:
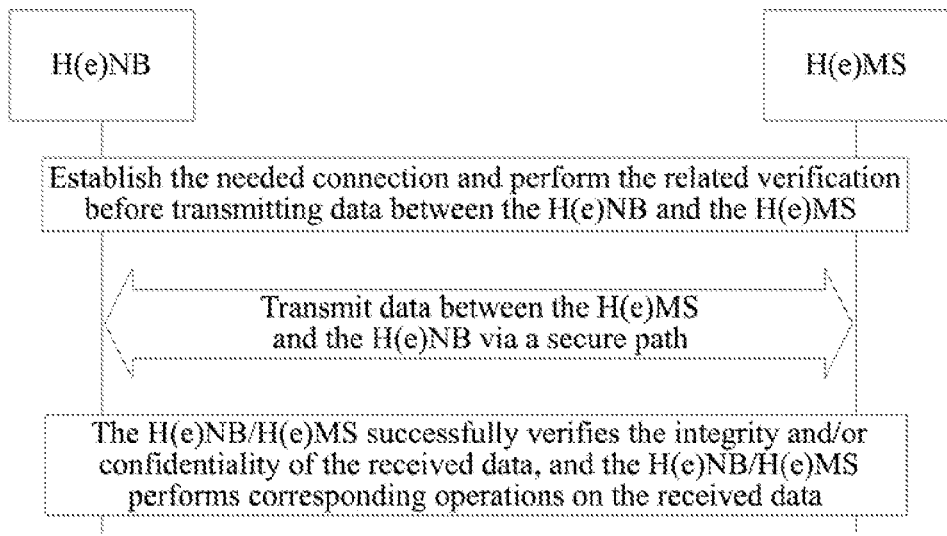
FIG. 6 is a third application example of a method for secure H(e)NB data transmission in accordance with the present invention.

In combination with FIG. 6, the third application example of the method for secure data transmission between the H(e)NB and the H(e)MS is described as follows:

Step 601, establish the needed connection and perform the related verification before transmitting data between the H(e)NB and the H(e)MS;

Step 602, transmit data between the H(e)MS and the H(e)NB via a secure path;

the transmitted data comprises the configuration data and/or the software update and/or the request message and so on;

the data transmission between the H(e)MS and the H(e)NB is protected by the IPsec tunnel and/or the TLS tunnel;

Step 603, the H(e)NB/H(e)MS verifies the integrity and/or confidentiality of the received data. If the verification is successful, the H(e)NB/H(e)MS performs corresponding operations, such as data configuration and/or software installation and/or message response and so on, on the received data.

Of course, the present invention has a variety of other examples, and for those skilled in the field, various corresponding modifications and variations can be made according to the present invention without departing from the spirit and essence of the present invention, but these corresponding modifications and variations should belong to the protection scope of the appended claims of the present invention.

It can be understood by those skilled in the field that all or part of steps in the abovementioned method can be fulfilled by instructing the relevant hardware with a program, and said program is stored in a computer readable storage medium such as read only memory, magnetic disk or optical disk and so on. Optionally, all or part of steps in the abovementioned example can be implemented with one or more integrated circuits. Correspondingly, each module/unit in the abovementioned example can be implemented in the form or hardware or in the form of software function module. The present invention is not limited to any specific form of the combination of hardware and software.

INDUSTRIAL APPLICABILITY

The present invention improves the data downloading mechanism of the existing H(e)NB, and increases the reliability and security of H(e)NB data transmission mechanism. It removes a variety of inconveniences and threats caused by the insecure data transmission and improperly handling the downloaded data of H(e)NB in practical applications.

What is claimed is:

1. A method for secure data transmission, comprising:
after a home Node-B (HNB) establishes a connection with a home Node-B management system (HMS), transmitting data between the HNB and the HMS via a secure path; when the HNB or the HMS receives data, verifying integrity and/or confidentiality of the received data, if verification fails, retaining all or part of the received data or discarding the received data; or,
after a home evolved Node-B (HeNB) establishes a connection with a home evolved Node-B management system (HeMS), transmitting data between the HeNB and the HeMS via the secure path; when the HeNB or the HeMS receives data, verifying the integrity and/or confidentiality of the received data, if the verification fails, retaining all or part of the received data or discarding the received data;
if the HNB or the HeNB or the HMS or the HeMS fails to verify the received data, further reporting to network elements related to data transmission.

2. The method of claim 1, wherein:
the data transmitted between the HNB and the HMS or between the HeNB and the HeMS comprises one or more of configuration data, software update data and request messages.

3. The method of claim 1, wherein:
the step of transmitting data between the HNB and the HMS via the secure path comprises:
protecting the data transmitted between the HNB and the HMS via an IP security protocol (IPsec) tunnel and/or a Transport Layer Security (TLS) tunnel;
the step of transmitting data between the HeNB and the HeMS via the secure path comprises:
protecting the data transmitted between the HeNB and the HeMS via the IPsec tunnel and/or the TLS tunnel.

4. The method of claim 1, wherein:
the network elements related to data transmission are one or more of following network elements:
the HNB or the HeNB or the HMS or the HeMS for transmitting data; or
a server indicated by the HMS or a server indicated by the HeMS.

5. The method of claim 1, wherein:
all or part of retained data is used in statistical analysis, fraud detection, error checking or further confirmation.

6. A user network equipment for secure data transmission, configured to:
after establishing a connection with a user network equipment management system, transmit data to or receive data from the user network equipment management system via a secure path; and
when receiving data, verify integrity and/or confidentiality of the received data, and if verification fails, retain or discard the received data; wherein,
said user network equipment comprises a home Node-B (HNB) or a home evolved Node-B (HeNB); said user network equipment management system comprises a home Node-B management system (HMS) or a home evolved Node-B management system (HeMS); the HNB establishes a connection with the HMS, and the HeNB establishes a connection with the HeMS;
the user network equipment is also configured to: if verification of the received data fails, report to the user network equipment management system transmitting data and/or a server indicated by the user network equipment management system.

7. A user network equipment management system for secure data transmission, configured to:
after establishing a connection with user network equipment, transmit data to or receive data from the user network equipment via a secure path; and
when receiving data, verify integrity and/or confidentiality of the received data, and if verification fails, retain or discard the received data; wherein,
said user network equipment management system comprises a home Node-B management system (HMS) or a home evolved Node-B management system (HeMS); said user network equipment comprises a home Node-B (HNB) or a home evolved Node-B (HeNB); the HMS establishes a connection with the HNB, and the HeMS establishes a connection with the HeNB;
the user network equipment management system is also configured to: if verification of the received data fails, report to the user network equipment transmitting data.

* * * * *